Patented May 16, 1967

3,320,254
BASIC ETHERS OF GUAIACOL AND THYMOL WITH POLYOXYETHYLENIC CHAIN AND THEIR DERIVATIVES
Massimo Carissimi and Franco Ravenna, Milan, Italy, assignors to Maggioni & C., S.p.A., Milan, Italy, a company of Italy
No Drawing. Filed Jan. 20, 1964, Ser. No. 338,609
Claims priority, application Italy, Jan. 24, 1963, 1,508/63; Dec. 5, 1963, 24,935/63
3 Claims. (Cl. 260—247.7)

The present invention relates to a series of basic ethers of guaiacol and thymol with a polyoxy-ethylenic chain and to their quaternary ammonium salts with alkyl halides.

The general formula of the compounds prepared by us is as follows:

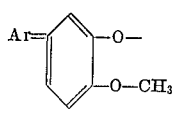

(guaiacol)

or $Ar(CH_2-CH_2-O)_n-CH_2-CH_2-Z$

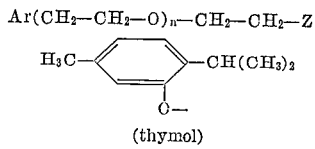

(thymol)

Z represents an amino group of general structure

wherein R and R' may be equal or different and are selected from the group consisting of alkyl, aralkyl radicals or hydrocarbon chains that may possibly be connected with one another either directly forming a ring which contains 4 or 5 carbon atoms, or by a bridge constituted by an atom of an element selected from the group consisting of oxygen, sulfur or nitrogen; or a quaternary ammonium group having the general structure

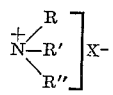

wherein R and R' have the preceding meaning and R" is an alkyl with a low number of carbon atoms and X⁻ is constituted by a mineral anion; $n$ is an integer smaller than 6.

The compounds according to the present invention are useful thanks to their pharmacological and therapeutical properties.

The two series of substances (derived from thymol and guaiacol) have been tested on the experimental cough induced in guinea-pigs by acrolein vapours and on that caused in the cat by means of electric laryngeal stimulation. In the former of these tests, they proved to be effective in inhibiting cough in doses varying from 20 to 40 mg./kg. while in the latter they did in doses of about 5 mg./kg. Said substances are also endowed with considerable hypotensive properties which appeared on injecting into the cat doses of from 2.5 to 10 mg./kg.

We can divide the substances according to the present invention into 5 main groups according to whether $n=1$; $n=2$; $n=3$; $n=4$; $n=5$.

The general process for their preparation consists in condensing respectively the beta-guaiacol-beta'-chlorodiethyl ether or the beta-thymol-beta'-chlordiethyl ether (which in turn are obtained by condensation respectively from an alkali metal salt of guaiacol and of thymol with beta,beta'-dichloro-diethyl ether in the presence of caustic alkalies) with a compound containing a nitrogen atom of aminic character: in particular for the compounds of the First Group ($n=1$) the condensation was carried out with a primary or secondary amine in the presence of a tertiary base or of an alkali metal or alkali-metal oxide; for the compounds of the Second Group ($n=2$) with an alkali metal salt of a beta-oxyethylamine; for the compounds of the Third Group ($n=3$) with an alkali metal salt of a beta-(2-amino-ethoxy)-ethanol; for the compounds of the Fourth Group ($n=4$) with an alkali metal salt of a 1-amino-8-hydroxy-3,6-dioxaoctane; for the compounds of the Fifth Group ($n=5$) with an alkali metal salt of a 1-amino-11-hydroxy-3,6,9-trioxaundecane.

The aminic groups of the above considered amines have the general formula

where R and R' have the meanings specified above. The quaternary ammonium salts are prepared by treating the tertiary bases, in the presence or not in the presence of a solvent, with an alkyl halide having a low number of carbon atoms.

The chemical-physical characteristics and the analytical data of the synthesized products are reported in Table A, as for the bases of the aminic derivatives; in Table B as for the salts of the same aminic derivatives; and in Table C, as for quaternary ammonium salts. Said tables are reported at the end of the specification. In Tables A and B a same aminic derivative corresponds to a same progressive number: in Table B those data which relate to those salts of the aminic derivatives which have not been analysed, are lacking.

Merely by way of example and without limitation are now reported some examples of preparation of various compounds according to the invention.

*Example 1.—Beta-guaiacol-beta'-chloro-diethyl ether*

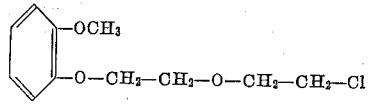

Into a flask equipped with a reflux cooler are put 124 g. (1 mole) of guaiacol, 500 ml. of ethylene glycol and 42 g. (105 mole) of ground NaOH. This mixture is heated till dissolving and there are added 150 g. (1.05 mole) of 2,2'-dichloro-diethyl ether. The mass is heated to boiling for 1 hour. The mixture is then cooled, poured into 2 l. of water and extracted 3 times with ether. After a short time, in the ethereal layer there forms a precipitate which, after some hours have lapsed, is eliminated by filtration. The ethereal layer is shaken once with 1 l. of 2% NaOH and twice with water. The solvent is dried on sodium sulfate and is evaporated. The residue is distilled at 120–126° C./0.5 mm. and it is re-distilled collecting the fraction at 124° C./0.5. mm. There are obtained 70 g. of an oil (30% of theory).

Percent Cl found: 15.37. Calculated: 15.52 for $C_{11}H_{15}ClO_3$; $n_D^{21}$ 1.5287; left alone it solidifies. M.P. 31–32° C.

*Example 2.—Beta-thymol-B'-chloro-diethyl ether*

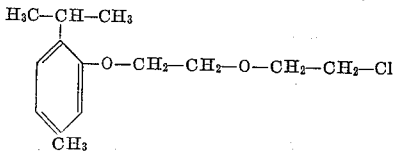

The method of preparation is identical to that described for the derivative of guaiacol. In the ether of extraction, however, there does not separate any precipitate. The product distils a first time at 120–235° C./1 mm. and is re-distilled collecting the fraction that passes over at 127° C./0.3 mm. Yield 38% of theory.

Percent of Cl found: 13.78. Calc.: 13.81 for $$C_{14}H_{21}ClO_3$$

$n_D^{20}=50.92$.

*Example 3.—Preparation of a compound of the First Group (n=1) beta-thymol-beta'-diethylamino-diethyl ether*

Into a small flask equipped with a reflux cooler there are put 25 g. of beta-thymol-beta'-chloro-diethyl ether, 125 ml. of n-hexanol, 50 ml. of pyridine and 75 ml. of diethyl amine. The whole is heated for 8 hours on an oil bath at 110° C., then the solvents are eliminated under vacuum together with the excess of diethyl amine and the residue is taken up with 150 ml. of HCl (5%) and 100 ml. of ether. The mass is stirred in a separating funnel until the solution becomes limpid, the ether is separated and the aqueous layer is extracted with ether further, twice. The aqueous solution so liberated from the non-basic products, is treated till sharp alkalinity with a 10% sodium carbonate solution. So an oily suspension is prepared which is extracted thrice with ether. The ethereal solution is dried on sodium sulfate and evaporated to dryness. The residue, constituted by an oil, is distilled twice, collecting the fraction boiling at 147° C./0.5 mm. Yield 16.6 g. (58% of theory): colourless oil.

Percent C found: 65.35; H, 9.50; N, 4.72; for $$C_{18}H_{31}NO_2$$

Calculated: C, 65.52; H, 9.77; N, 4.77.

*Example 4.—Preparation of a compound of the Second, Third, Fourth and Fifth Groups (n=2; n=3; n=4; n=5) beta-guaiacol-beta-(diethyl - amino - ethoxy)-diethyl ether*

Into a small flask equipped with mechanical stirring, cocked funnel and reflux cooler with $CaCl_2$ tube, there are put 40 ml. of xylene and 1.4 g. (0.2 mole) of lithium (or 4.6 g. of sodium). At boiling temperature there are added in small portions 23.4 g. (0.2 mole) of beta-diethyl amino ethanol and the whole is heated while refluxing for 7 hours. Then into the boiling solution there are introduced 46 g. (0.2 mole) of beta-chloro-beta'-(o-methoxy-phenoxy)-diethyl ether and heating is carried on for 6 hours while refluxing. After cooling there are added 100 ml. of 15% HCl. The aqueous layer is separated and the xylenic solution is extracted with little water that is added to the already separated acid solution. This latter is further purified by extracting twice with ether. Then one proceeds to alkalizing by means of a 10% sodium carbonate solution. The oil that is separated is extracted thrice with ether, the solution is dried on sodium sulfate and is evaporated to dryness. The oily residue distils at 160° C./0.5 mm. The yield is 25 g. (40% of theory).

Percent C found: 65.79; H, 9.38; N, 4.55; for $$C_{17}H_{29}NO_4$$

Calculated: 65.56; H, 9.38; N, 4.50.

For $n=3$, in lieu of beta-diethylaminoethanol there is used an equivalent quantity of beta-diethylamino ethoxy ethanol and the procedure is equal to the described one.

For $n=4$, in lieu of beta-diethylamino ethanol one uses an equivalent quantity of 1-diethyl amino-8-hydroxy-3,6-dioxaoctane and the procedure is equal to the described one.

For $n=5$, in lieu of beta-diethylamino ethanol one uses an equivalent quantity of 1-diethylamino-11-hydroxy-3,6,9-trioxaundecane and the procedure is equal to the described one.

To prepare the derivatives of thymol in lieu of beta-chloro-beta'-(o-methoxyphenoxy)-diethyl ether one uses beta - (2-methyl-5-isopropyl phenoxy)-beta'-chlorodiethyl ether in equivalent quantities and the procedure is equal to that described. Moreover to obtain the compounds that in lieu of the diethyl-aminic group carry the other aminic groups of the compounds claimed by us, one uses equivalent compounds of the corresponding aminic derivatives and the procedure remains the same unvaried.

*Example 5.—Preparation of quaternary ammonium salts*

These compounds are prepared by leaving 2 g. of tertiary base and 3 ml. of ethyl iodide for 24 hours in the dark. After elimination of the ethyl iodide under vacuum the oily residue is taken up with ether and is purified by boiling it with acetone. The acetonic solution is filtered in the presence of animal carbon and is evaporated under vacuum. As to the yields and the properties see Table C below.

TABLE A $$Ar-(CH_2-CH_2-O-)_n-CH_2-CH_2-Z$$

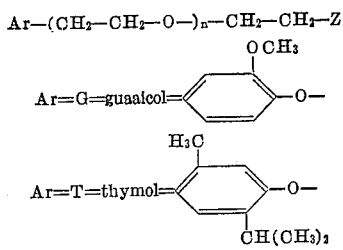

| No. | Ar | n | Z | Formula | Yield, Percent | B.P. | Base | | | | Analysis | | | |
|---|---|---|---|---|---|---|---|---|---|---|---|---|---|---|
| | | | | | | | Percent C | | Percent H | | Percent N | | Percent O | |
| | | | | | | | Calc. | Found | Calc. | Found | Calc. | Found | Calc. | Found |
| 1 | G | 1 | —N(C₂H₅)₂ | C₁₅H₂₅NO₃ | 57 | 127–29/0.5 mm | | | | | 5.24 | 5.18 | | |
| 2 | G | 1 | —N⬡ | C₁₆H₂₅NO₃ | 77 | 145°/0.5 mm | 68.74 | 69.74 | 9.02 | 9.50 | 5.03 | 5.01 | | |
| 3 | G | 1 | —N⬡O | C₁₅H₂₃NO₄ | 74 | 158°/0.5 mm | 64.03 | 64.29 | 8.24 | 8.26 | 4.98 | 4.98 | | |
| 4 | G | 1 | —N⬡N—CH₃ | C₁₆H₂₆N₂O₃ | 31 | 170/0.5 mm | 65.27 | 65.15 | 8.90 | 9.20 | 9.51 | 9.35 | | |

TABLE A—Continued

| No. | Ar | n | Z | Formula | Yield, Percent | B.P. | Base Percent C Calc. | Found | Percent H Calc. | Found | Analysis Percent N Calc. | Found | Percent O Calc. | Found |
|---|---|---|---|---|---|---|---|---|---|---|---|---|---|---|
| 5 | G | 1 | —N(piperidino) | $C_{15}H_{23}NO_3$ | 78 | 140/1 mm | 67.89 | 67.82 | 8.73 | 8.71 | 5.27 | 5.22 | | |
| 6 | T | 1 | —N(C$_2$H$_5$)$_2$ | $C_{18}H_{31}NO_2$ | 58 | 147/0.5 mm | | | | | 4.77 | 4.72 | | |
| 7 | T | 1 | —N(morpholino) | $C_{18}H_{29}NO_3$ | 50 | 168–70/1 mm | | | | | 4.55 | 4.33 | | |
| 8 | T | 1 | —N(piperidino) | $C_{19}H_{31}NO_2$ | 58 | 157/1 mm | | | | | 4.58 | 4.48 | | |
| 9 | T | 1 | —N(N-CH$_3$ piperazino) | $C_{19}H_{32}N_2O_2$ | 70 | 175/0.5 mm | 71.20 | 71.41 | 10.06 | 9.84 | 8.74 | 8.47 | | |
| 10 | T | 1 | —N(pyrrolidino) | $C_{18}H_{29}NO_2$ | 82 | 160/1 mm | 74.18 | 74.83 | 10.03 | 8.55 | 4.80 | 2.74 | | |
| 11 | G | 2 | —N(C$_2$H$_5$)$_2$ | $C_{17}H_{29}NO_4$ | 40 | 153/0.5 mm | 65.56 | 65.79 | 9.38 | 9.38 | 4.50 | 4.55 | | |
| 12 | G | 2 | —N(morpholino) | $C_{17}H_{27}NO_5$ | 25 | 184/0.5 mm | 62.74 | 62.74 | 8.36 | 7.76 | 4.16 | 4.16 | | |
| 13 | G | 2 | —N(piperidino) | $C_{18}H_{29}NO_4$ | 34 | 190–93/0.5 mm | 66.84 | 66.94 | 9.03 | 9.15 | 4.33 | 4.37 | | |
| 14 | G | 2 | —N(N-CH$_3$ piperazino) | $C_{18}H_{30}N_2O_4$ | 21 | 180/0.5 mm | 63.87 | 63.74 | 8.93 | 8.87 | 8.27 | 8.24 | | |
| 15 | G | 2 | —N(pyrrolidino) | $C_{17}H_{27}NO_4$ | 20 | 178/1 mm | 65.98 | 65.93 | 8.79 | 8.70 | 4.52 | 4.52 | | |
| 16 | T | 2 | —N(C$_2$H$_5$)$_2$ | $C_{20}H_{35}NO_3$ | 33 | 154/0.5 mm | 71.17 | 71.42 | 10.45 | 10.23 | 4.17 | 4.21 | | |
| 17 | T | 2 | —N(morpholino) | $C_{20}H_{33}NO_4$ | 19 | 178–80/0.5 mm | | | | | 3.98 | 4.19 | | |
| 18 | T | 2 | —N(piperidino) | $C_{21}H_{35}NO_3$ | 30 | 167–71/0.5 mm | | | | | 4.00 | 3.92 | | |
| 19 | T | 2 | —N(N-CH$_3$ piperazino) | $C_{21}H_{36}N_2O_3$ | 28 | 187/0.5 mm | 69.18 | 70.07 | 9.95 | 9.73 | 7.68 | 7.57 | | |
| 20 | T | 2 | —N(pyrrolidino) | $C_{20}H_{33}NO_3$ | 32 | 180/0.5 mm | 71.60 | 71.56 | 9.91 | 9.88 | 4.17 | 4.15 | | |
| 21 | G | 3 | —N(C$_2$H$_5$)$_2$ | $C_{19}H_{33}NO_5$ | 24 | 182–84/0.5 mm | 64.19 | 64.48 | 9.35 | 9.24 | 3.94 | 3.98 | 22.50 | 22.36 |
| 22 | G | 3 | —N(piperidino) | $C_{20}H_{33}NO_5$ | 18 | 185/1 mm | 65.36 | 65.62 | 9.05 | 8.93 | 3.81 | 3.75 | 21.77 | 22.0 |
| 23 | G | 3 | —N(morpholino) | $C_{19}H_{31}NO_6$ | 29 | 190/1 mm | 61.76 | 61.80 | 8.45 | 8.44 | 3.79 | 3.79 | 25.98 | 26.21 |
| 24 | G | 3 | —N(N-CH$_3$ piperazino) | $C_{20}H_{34}N_2O_5$ | 24 | 190/1 mm | 62.79 | 62.80 | 8.96 | 8.98 | 7.32 | 7.28 | 20.91 | 21.14 |
| 25 | G | 3 | —N(pyrrolidino) | $C_{19}H_{31}NO_5$ | 26 | 185/0.5 mm | 64.55 | 64.71 | 8.84 | 8.92 | 3.96 | 4.00 | 22.63 | 22.84 |
| 26 | T | 3 | —N(C$_2$H$_5$)$_2$ | $C_{22}H_{39}NO_4$ | 27 | 184/0.5 mm | 69.25 | 69.11 | 10.30 | 10.00 | 3.67 | 3.71 | 16.77 | 16.63 |
| 27 | T | 3 | —N(piperidino) | $C_{23}H_{39}NO_4$ | 27 | 180/1 mm | 70.19 | 70.21 | 9.99 | 10.25 | 3.55 | 3.55 | 16.27 | 16.42 |
| 28 | T | 3 | —N(morpholino) | $C_{22}H_{37}NO_5$ | 35 | 180/1 mm | 66.80 | 66.96 | 9.43 | 9.10 | 3.54 | 3.54 | 20.22 | 20.54 |
| 29 | T | 3 | —N(N-CH$_3$ piperazino) | $C_{23}H_{40}N_2O_4$ | 31 | 195/0.5 mm | 67.60 | 67.58 | 9.86 | 9.92 | 6.85 | 6.82 | 15.66 | 15.69 |
| 30 | T | 3 | —N(pyrrolidino) | $C_{22}H_{37}NO_4$ | 28 | 187/0.5 mm | 69.63 | 69.61 | 9.82 | 9.62 | 3.69 | 3.70 | 16.86 | 17.12 |
| 31 | G | 4 | —N(C$_2$H$_5$)$_2$ | $C_{21}H_{37}NO_6$ | 23 | 209/1 mm | 63.13 | 63.03 | 9.33 | 9.27 | 3.50 | 3.50 | 24.03 | 24.6 |

TABLE A—Continued

| No. | Ar | n | Z | Formula | Yield, Percent | B.P. | Base Percent C Calc. | Found | Percent H Calc. | Found | Analysis Percent N Calc. | Found | Percent O Calc. | Found |
|---|---|---|---|---|---|---|---|---|---|---|---|---|---|---|
| 32 | G | 4 | —N(piperidine) | C$_{22}$H$_{37}$NO$_6$ | 20 | 188/0.3 mm | 64.20 | 64.35 | 9.06 | 9.00 | 3.40 | 3.41 | 23.32 | 23.50 |
| 33 | T | 4 | —N(C$_2$H$_5$)$_2$ | C$_{24}$H$_{43}$NO$_5$ | 25 | 210/1 mm | 67.72 | 67.70 | 10.18 | 10.13 | 3.29 | 3.26 | 18.79 | 19.06 |
| 34 | T | 4 | —N(piperidine) | C$_{25}$H$_{43}$NO$_5$ | 28 | 190/0.3 mm | 68.61 | 68.73 | 9.90 | 10.01 | 3.20 | 3.24 | 18.28 | 18.46 |
| 35 | G | 5 | —N(C$_2$H$_5$)$_2$ | C$_{23}$H$_{41}$NO$_7$ | 23 | 215/1 mm | 62.27 | 62.24 | 9.32 | 9.16 | 3.15 | 3.15 | 25.25 | 25.26 |
| 36 | G | 5 | —N(piperidine) | C$_{24}$H$_{41}$NO$_7$ | 26 | 191/0.3 mm | 63.26 | 63.31 | 9.07 | 8.95 | 3.07 | 3.09 | 24.58 | 24.63 |
| 37 | T | 5 | —N(C$_2$H$_5$)$_2$ | C$_{26}$H$_{47}$NO$_6$ | 27 | 175–80/1 mm | 66.49 | 66.62 | 10.08 | 10.30 | 2.98 | 2.96 | 20.44 | 20.65 |
| 38 | T | 5 | —N(piperidine) | C$_{27}$H$_{47}$NO$_6$ | 29 | 190/0.3 mm | 67.32 | 67.54 | 9.83 | 9.95 | 2.91 | 2.94 | 19.93 | 20.03 |

TABLE B

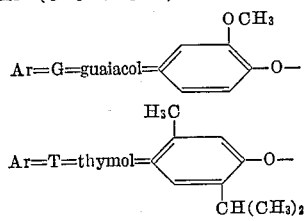

Ar—(CH$_2$—CH$_2$—O)$_n$—CH$_2$—CH$_2$—Z

Ar=G=guaiacol

Ar=T=thymol

| No. | Name of salt | M.P. | Crystallization Solvent | Salts Percent C Calc. | Found | Percent H Calc. | Found | Analysis Percent N Calc. | Found | Percent Cl Calc. | Found |
|---|---|---|---|---|---|---|---|---|---|---|---|
| 1 | | | | | | | | | | | |
| 2 | | | | | | | | | | | |
| 3 | | | | | | | | | 7.66 | 7.63 | 19.41 | 19.20 |
| 4 | Hydrochloride | 215–17 | Ethanol | | | | | | | | |
| 5 | | | | | | | | | | | |
| 6 | Hydrochloride | 89–90 | Dioxane plus petroleum ether | 65.52 | 65.35 | 9.77 | 9.50 | 4.24 | 4.35 | 10.74 | 10.73 |
| 7 | Acid oxalate (C$_{20}$H$_{31}$NO$_7$) | 147 | Ethanol | 60.43 | 60.50 | 7.86 | 7.66 | 3.52 | 3.60 | | |
| 8 | Acid oxalate (C$_{21}$H$_{36}$NO$_6$) | 146 | do | 63.77 | 63.99 | 8.41 | 8.28 | 3.54 | 3.81 | | |
| 9 | Di-hydrochloride | 198–200 | Dioxane 90, ethanol 10 | | | | | 7.10 | 7.07 | 18.02 | 18.01 |
| 10 | Citrate (C$_{24}$H$_{37}$NO$_9$) | 82–83 | | | | | | 2.89 | 2.85 | | |
| 11 | | | | | | | | | | | |
| 12 | | | | | | | | | | | |
| 13 | | | | | | | | | | | |
| 14 | Dicitrate (C$_{30}$H$_{46}$N$_2$O$_{15}$) | 87–91 | Isopropanol ether | | | | | 3.87 | 3.85 | | |
| 15 | | | | | | | | | | | |
| 16 | | | | | | | | | | | |
| 17 | Acid oxalate (C$_{22}$H$_{35}$NO$_8$) | 90–92 | Isopropanol | 59.54 | 59.70 | 7.99 | 7.90 | 3.17 | 3.18 | | |
| 18 | Acid oxalate (C$_{23}$H$_{37}$NO$_7$) | 89–90 | do | 62.84 | 63.24 | 8.48 | 8.46 | 3.18 | 3.15 | | |
| 19 | Dihydrochloride | 173–74 | Propanol ether | | | | | 6.40 | 6.38 | 16.21 | 16.05 |

TABLE C

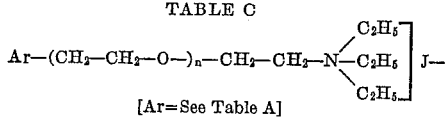

[Ar=See Table A]

| No. | Ar | n | Formula | Yield | M.P. | Crystallization Solvent | Percent J Calc. | Percent J Found | Percent N Calc. | Percent N Found |
|---|---|---|---|---|---|---|---|---|---|---|
| 1 | G | 1 | $C_{17}H_{30}JNO_3$ | 70 | 94 | Isopropanol | 29.98 | 30.73 | 3.30 | 3.39 |
| 2 | T | 1 | $C_{20}H_{36}JNO_2$ | 73 | 109 | Isopropanol plus ether | 29.24 | 28.62 | 3.11 | 3.11 |
| 3 | G | 2 | $C_{19}H_{34}JNO_4$ | 75 | Oil [1] | | 27.15 | 26.86 | 2.99 | 3.04 |
| 4 | T | 2 | $C_{22}H_{40}JNO_3$ | 69 | 66–86 | (2) | 25.71 | 25.05 | 2.83 | 2.96 |
| 5 | G | 3 | $C_{21}H_{38}JNO_5$ | 87 | Oil [1] | | 24.81 | 24.91 | 2.73 | 2.75 |
| 6 | T | 3 | $C_{24}H_{44}JNO_4$ | 69 | | (3) | 23.61 | 24.64 | 2.60 | 2.63 |
| 7 | G | 4 | $C_{23}H_{42}JNO_6$ | 78 | Oil [1] | | 22.84 | 22.64 | 2.52 | 2.46 |
| 8 | T | 4 | $C_{26}H_{48}JNO_5$ | 79 | Oil [1] | | 21.82 | 21.75 | 2.40 | 2.38 |
| 9 | G | 5 | $C_{25}H_{46}JNO_7$ | 81 | Oil [1] | | 21.17 | 20.86 | 2.33 | 2.28 |
| 10 | T | 5 | $C_{28}H_{52}JNO_6$ | 80 | Oil [1] | | 20.75 | 20.68 | 2.29 | 2.30 |

[1] One purifies boiling in acetone, filtering in the presence of active carbon and evaporating under vacuum.
[2] Purified by repeated washing with anhydrous ether.
[3] One purifies as in (1). Soft crystals which are extremely hygroscopic.

We claim:
1. A compound selected from the group consisting of basic ethers having the formula:

$$Ar(CH_2-CH_2-O-)_n-CH_2-CH_2-Z$$

and their nontoxic acid addition salts; where Ar is

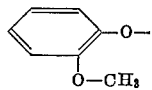

or

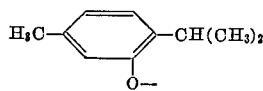

$n$ is an integer from 1 to 5 inclusive; and Z is selected from the group consisting of piperidino, morpholino, N-methyl-piperazino, pyrrolidino, an amino group of the formula

or a quaternary ammonium group of the formula

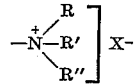

where R, R' and R'' are ethyl, and X− is an anion.

2. A compound according to claim 1, wherein Z is selected from the group consisting of piperidino, morpholino, N-methyl-piperazino or pyrrolidino.

3. A compound according to claim 1 wherein Z is a quaternary ammonium group.

References Cited by the Examiner

UNITED STATES PATENTS 1,915,334  6/1933  Salzberg et al. _____ 260—243
2,075,359  3/1937  Salzberg et al. _____ 167—22
3,213,140  10/1965  Mills _____ 260—570.7

ALEX MAZEL, *Primary Examiner.*

J. TOVAR, *Assistant Examiner.*